(12) United States Patent  
Murayama et al.

(10) Patent No.: US 11,997,713 B2
(45) Date of Patent: May 28, 2024

(54) TRANSMISSION APPARATUS AND RADIO COMMUNICATION METHOD

(71) Applicant: NTT DOCOMO, INC., Tokyo (JP)

(72) Inventors: Daisuke Murayama, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 383 days.

(21) Appl. No.: 17/425,219

(22) PCT Filed: Jan. 22, 2020

(86) PCT No.: PCT/JP2020/002051
§ 371 (c)(1),
(2) Date: Jul. 22, 2021

(87) PCT Pub. No.: WO2020/153388
PCT Pub. Date: Jul. 30, 2020

(65) Prior Publication Data
US 2022/0124805 A1 Apr. 21, 2022

(30) Foreign Application Priority Data

Jan. 23, 2019 (JP) .................................. 2019-022055

(51) Int. Cl.
*H04W 72/04* (2023.01)
*H04L 27/26* (2006.01)
*H04W 72/0453* (2023.01)
*H04W 74/08* (2009.01)
*H04W 74/0816* (2024.01)

(52) U.S. Cl.
CPC ..... *H04W 74/0816* (2013.01); *H04L 27/2607* (2013.01); *H04W 72/0453* (2013.01); *H04W 74/0866* (2013.01)

(58) Field of Classification Search
CPC ......... H04W 74/0816; H04W 72/0453; H04W 74/0866; H04L 27/2607
See application file for complete search history.

(56) References Cited

U.S. PATENT DOCUMENTS

| 2017/0099667 | A1* | 4/2017 | Dinan | H04W 74/006 |
| 2018/0132197 | A1* | 5/2018 | Lin | H04W 52/242 |
| 2018/0235005 | A1* | 8/2018 | Ansari | H04L 27/0006 |
| 2018/0255578 | A1* | 9/2018 | Kim | H04W 74/0808 |
| 2018/0352537 | A1* | 12/2018 | Zhang | H04W 72/04 |
| 2019/0053229 | A1* | 2/2019 | Kim | H04W 72/0446 |
| 2019/0253200 | A1* | 8/2019 | Salem | H04W 74/0808 |
| 2019/0289513 | A1* | 9/2019 | Jeon | H04W 36/06 |

(Continued)

OTHER PUBLICATIONS

International Search Report issued in PCT/JP2020/002051 dated Mar. 31, 2020 (2 pages).

(Continued)

*Primary Examiner* — Fahmida S Chowdhury
(74) *Attorney, Agent, or Firm* — Osha Bergman Watanabe & Burton LLP

(57) ABSTRACT

To appropriately control transmission of a channel when listening is performed for each given band in a carrier. A transmission apparatus according to an aspect of the present disclosure includes: a control section that controls transmission of the channel in at least one of a plurality of contiguous bands provided in a carrier based on a result of listening for each band provided in the carrier.

5 Claims, 8 Drawing Sheets

(56) References Cited

U.S. PATENT DOCUMENTS

| | | | |
|---|---|---|---|
| 2021/0092622 A1* | 3/2021 | Tiirola | H04L 1/0038 |
| 2021/0227549 A1* | 7/2021 | Murayama | H04W 72/0453 |
| 2021/0235492 A1* | 7/2021 | Iyer | H04W 72/23 |
| 2022/0053536 A1* | 2/2022 | Lei | H04W 72/20 |
| 2022/0124805 A1* | 4/2022 | Murayama | H04W 74/0808 |

OTHER PUBLICATIONS

Written Opinion of the International Searching Authority issued in PCT/JP2020/002051 dated Mar. 31, 2020 (4 pages).
LG Electronics; "Wide-band operation for NR-U"; 3GPP TSG RAN WG1 Ad-Hoc Meeting 1901, R1-1900610; Taipei, Taiwan; Jan. 21-25, 2019 (7 pages).
OPPO; "DL design for NR-U"; 3GPP TSG RAN WG1 Meeting #94, R1-1808897; Gothenburg, Sweden; Aug. 20-24, 2018 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report in counterpart European Application No. 20745640.1 dated Sep. 15, 2022 (6 pages).
AT&T; "Wideband operation for NR-based access to unlicensed spectrum"; 3GPP TSG RAN WG1 Ad-Hoc Meeting 1901, R1-1900457; Taipei, Taiwan; Jan. 21-25, 2019 (3 pages).
Ericsson; "Wideband operation for NR-U"; 3GPP TSG-RAN WG1 Meeting Ad Hoc 1901, R1-1901002; Taipei, Taiwan; Jan. 21-25, 2019 (5 pages).

* cited by examiner

TRANSMISSION APPARATUS AND RADIO COMMUNICATION METHOD

TECHNICAL FIELD

The present invention relates to a transmission apparatus and a radio communication method in next-generation mobile communication systems.

BACKGROUND ART

In the universal mobile telecommunications system (UMTS) network, the specifications of long term evolution (LTE) have been drafted for the purpose of further increasing high speed data rates, providing lower delays, and the like (see Non Patent Literature 1). Further, successor systems of LTE are also under study for the purpose of achieving further broad band and increased speed beyond LTE (for example, also referred to as LTE-Advanced (LTE-A), Future Radio Access (FRA), 4G, 5G, 5G+(plus), New RAT (NR), 3rd Generation Partnership Project (3GPP) Rel.14, 15, 16 or later versions, and the like).

In existing LTE systems (for example, Rel.8 to 12), the specifications have been drafted assuming that exclusive operation is performed in a frequency band licensed to a telecommunications operator (operator) (also referred to as a licensed band, a licensed carrier, a licensed component carrier (CC), and the like). As the licensed CC, for example, 800 MHz, 1.7 GHz, 2 GHz, or the like, is used.

Further, in the existing LTE system (for example, Rel.13), in order to extend the frequency band, the use of a frequency band different from the above licensed band (also referred to as an unlicensed band, an unlicensed carrier or an unlicensed CC) is supported. As the unlicensed band, for example, 2.4 GHz band or 5 GHz band in which Wi-Fi (registered trademark) or Bluetooth (registered trademark) can be used is assumed.

Specifically, in Rel.13, carrier aggregation (CA) that integrates a carrier (CC) in the licensed band and a carrier (CC) in the unlicensed band is supported. The communication performed using the unlicensed band together with the licensed band is called license-assisted access (LAA).

Regarding the use of LAA, the use of LAA has been considered also in future radio communication systems (for example, 5G, 5G+, NR, and Rel.15 or later versions). In the future, it is possible that use of LAA will be considered also in dual connectivity (DC) between the licensed band and the unlicensed band and stand-alone (SA) of the unlicensed band.

CITATION LIST

Non Patent Literature

Non Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Since the unlicensed carrier is a band shared by a plurality of operators and the like, listening for checking whether or not transmission is performed by another apparatus (for example, a base station, user terminal, a Wi-Fi (registered trademark) apparatus, or the like) is performed before transmission of a signal. The listening is also referred to as LBT: listen before talk, CCA: clear channel assessment, carrier sense or channel access procedure, or the like.

In a future radio communication system (hereinafter, also referred to as NR or the like), it is assumed that a carrier having a bandwidth wider than a given bandwidth (for example, 20 MHz) (also referred to as a wide band carrier or the like) is used as an unlicensed carrier. Therefore, in the NR, it is also considered to perform listening for each given band (also referred to as an LBT subband or the like) in the carrier.

However, when listening is performed for each given band in the carrier, there is a possibility that transmission of a channel (for example, a downlink shared channel (physical downlink shared channel (PDSCH)) or an uplink shared channel (physical uplink shared channel (PUSCH))) cannot be appropriately controlled.

The present invention has been made in view of the above, and an object of the present invention is to provide a transmission apparatus and a radio communication method capable of appropriately controlling transmission of a channel in a case where listening is performed for each given band in a carrier.

Solution to Problem

A transmission apparatus according to an aspect of the present invention includes: a transmitting section that transmits a channel; and a control section that controls transmission of the channel in at least one of a plurality of contiguous bands provided in a carrier based on a result of listening for each band provided in the carrier.

Advantageous Effects of Invention

According to the present invention, it is possible to appropriately control transmission of a channel when listening is performed for each given band in a carrier.

DESCRIPTION OF EMBODIMENTS

Figure 1:
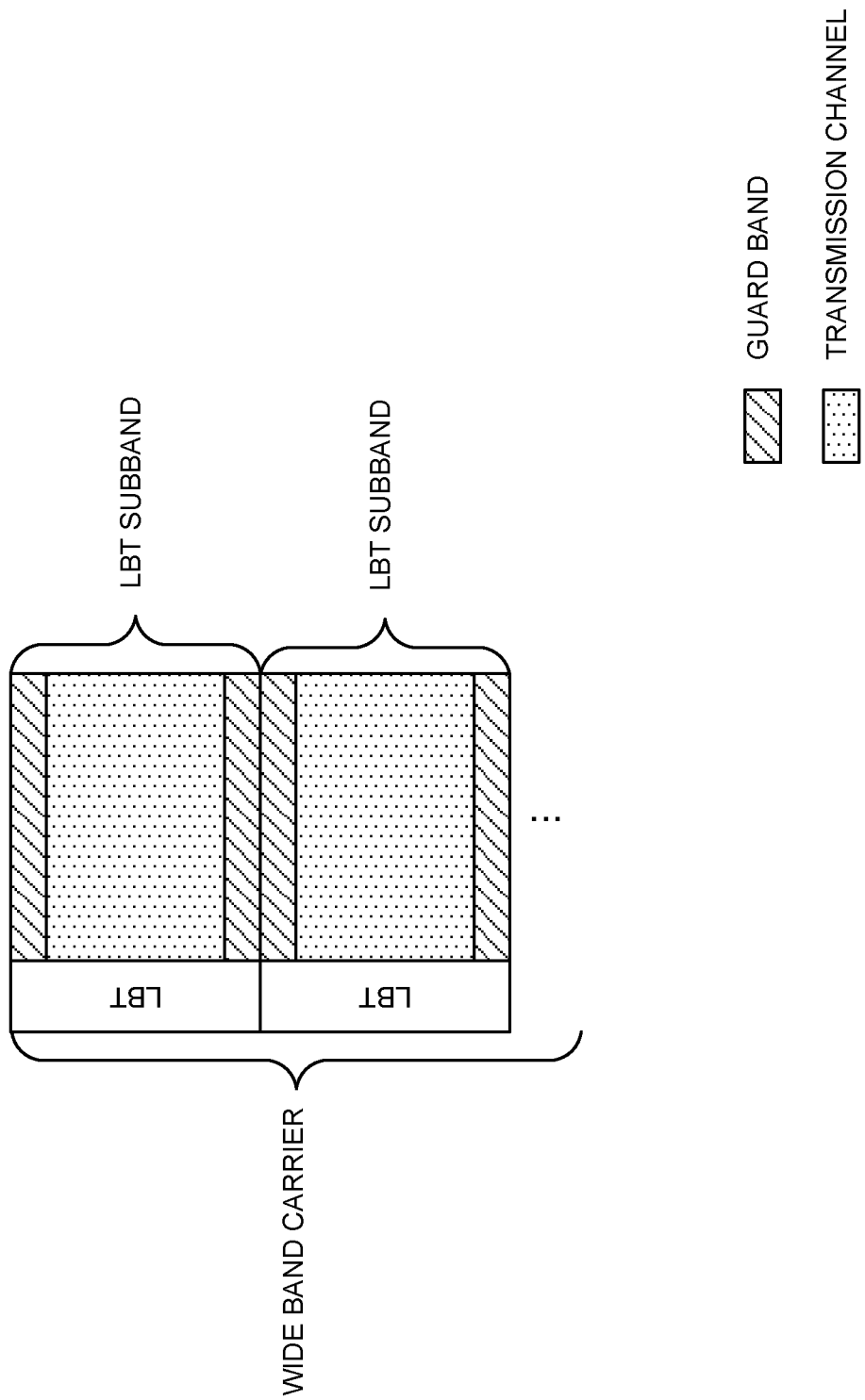
FIG. 1 is a diagram illustrating an example of a wide band carrier used in a NR-U.

In the NR, it is considered to use not only a licensed carrier (a carrier in a licensed band) but also an unlicensed carrier (a carrier in an unlicensed band) for communication. The licensed carrier is a carrier of a frequency exclusively allocated to one operator. The unlicensed carrier is a carrier of a frequency shared among a plurality of operators, RATS, and the like.

The licensed carrier is also referred to as a component carrier (CC), a cell, a primary cell (PCell), a secondary cell (SCell), a primary secondary cell (PSCell), or the like. Further, the unlicensed carrier is also referred to as NR-unlicensed (NR-U), CC, unlicensed CC, cell, license-assisted access SCell (LAA SCell), or the like.

In a system (for example, a licensed assisted access (LAA) system) in which NR or the like is operated in an unlicensed carrier, an interference control function is considered to be necessary for coexistence with NR or LTE of another operator, a wireless local area network (LAN), or another system. Note that an operation mode of the LAA system may be any of dual connectivity (DC) with a licensed carrier, carrier aggregation (CA), or standalone (SA), and may be referred to as LAA, NR-U, or the like.

In general, when a transmission point (for example, a base station (gNodeB (gNB), eNodeB (eNB)), user terminal ((UE), or the like) that performs communication using an unlicensed carrier detects another entity (for example, another UE) that is performing communication with the unlicensed carrier, it is prohibited to perform transmission with the carrier.

Therefore, the transmission point executes listening (LBT) at a timing a given period before the transmission timing. Specifically, the transmission point that executes LBT searches a target band (for example, one component carrier (CC)) at a timing (for example, last subframe) a given period before the transmission timing, and checks whether or not another apparatus (for example, a base station, UE, Wi-Fi apparatus, or the like) is communicating in the band.

Note that, in the present specification, listening refers to an operation of detecting/measuring whether or not a signal exceeding a given level (for example, given power) is transmitted from another transmission point or the like before a given transmission point (for example, a base station, user terminal, or the like) transmits a signal. Further, the listening performed by the transmission point is also referred to as listen before talk (LBT), clear channel assessment (CCA), carrier sense or channel access procedure, or the like. Further, an access method with collision control (also referred to as receiver assisted access, receiver assisted LBT, or the like) may be applied to the unlicensed carrier.

When the transmission point can confirm that another apparatus is not performing communication, the transmission point performs transmission using the carrier. For example, when the received power measured by listening is equal to or less than a given threshold value, the transmission point determines that the channel is in a free state and performs transmission. "The channel is in a free state" in other words means that the channel is not occupied by a specific system, and also means that the channel is idle, the channel is clear, the channel is free, listening succeeds, and the like.

On the other hand, when the transmission point detects that another apparatus is using even a part of the target carrier band, the transmission point stops its own transmission processing. For example, in a case where the transmission point detects that the received power of a signal from another apparatus related to the band exceeds a given threshold value, the transmission point determines that the channel is in a busy state and does not perform transmission. In the case of the busy state, the channel is available only after listening is performed again and it is confirmed that the channel is in a free state. Note that the method of determining the free state/busy state of the channel by the LBT is not limited thereto.

As described above, in the NR-U, by introducing interference control within the same frequency based on the LBT mechanism into the transmission point, it is possible to avoid interference between LAA and Wi-Fi, interference between LAA systems, and the like. Further, even in a case where the transmission point is controlled independently for each operator who operates the LAA system, the interference can be reduced without grasping each control content by the LBT.

Meanwhile, in the NR-U, it is assumed that a carrier having a bandwidth wider than a given bandwidth (for example, 20 MHz) (also referred to as a wide band carrier, a wide band, a LAAS cell, a LAA cell, an NR-U carrier, an NR-U cell, a cell, or the like) is used.

In the wide band carrier, it is also considered to perform listening for each partial band in the carrier instead of the entire carrier. The partial band is also referred to as a given band, a sub-band, an LBT subband, or the like.

FIG. 1 is a diagram illustrating an example of a wide band carrier used in a NR-U. As illustrated in FIG. 1, the wide band carrier may include a plurality of LBT subbands. A guard band (also referred to as a guard area or the like) may be provided at least at one end of each LBT subband.

In FIG. 1, a transmission point (for example, UE or a base station) may perform LBT for each LBT subband. The transmission point may control transmission of a channel (also referred to as a subchannel or the like) in each LBT subband according to a result of LBT in each LBT subband. The subchannel may be, for example, a downlink shared channel (physical downlink shared channel (PDSCH)) or an uplink shared channel (physical uplink shared channel (PUSCH))).

Further, it is also considered that the transmission point transmits the above subchannel across a plurality of contiguous or non-contiguous LBT subbands in a wide band carrier.

Further, in downlink (DL), the following options have been studied as a control operation for PDSCH transmission based on a bandwidth part (BWP) in the wide band carrier.

(1a) Transmitting a PDSCH with one or more BWPs when a plurality of BWPs are configured in the wide band carrier and the plurality of BWPs are activated.

(1b) Transmitting a PDSCH with a single BWP when a plurality of BWPs are configured in the wide band carrier and the plurality of BWPs are activated.

(2) Transmitting a PDSCH with a single BWP in a case where a plurality of BWPs are configured in the wide band carrier and a single BWP is activated if CCA is successful for the whole BWP in a base station.

(3) Transmitting a PDSCH with at least a part of BWP for which CCA is successful in a base station when a plurality of BWPs are configured in the wide band carrier and a single BWP is activated.

Further, in uplink (UL), the following options have been studied as a control operation for PUSCH transmission based on BWP in the wide band carrier.

(1a) Transmitting a PUSCH with one or more BWPs when a plurality of BWPs are configured in the wide band carrier and the plurality of BWPs are activated.

(1b) Transmitting a PUSCH with a single BWP when a plurality of BWPs are configured in the wide band carrier and the plurality of BWPs are activated.

(2) Transmitting a PUSCH with a single BWP in a case where a plurality of BWPs are configured in the wide band carrier and a single BWP is activated if CCA is successful for the whole BWP in UE.

(3) Transmitting a PUSCH with at least a part of BWP for which CCA is successful in UE when a plurality of BWPs are configured in the wide band carrier and a single BWP is activated.

It may be declared whether or not the CCA (LBT) succeeds in multiples of 20 MHz. The CCA may be LBT performed for each LBT subband (see FIG. 1). In this case, the bandwidth of each LBT subband may be a multiple of 20 MHz.

Note that at least one of the position and the bandwidth of each LBT subband in the wide band carrier may be the same as or different from the BWP. For example, one or more LBT subbands may be provided in the BWP.

Further, in the wide band carrier, the LBT subband and the BWP may be configured separately (independently) or may be configured in common. In the wide band band carrier, at least a part of the LBT subband and the BWP may overlap or may not overlap.

As described above, in at least one of DL and UL of NR, as exemplified in the above option (3), it is considered to dynamically use a free band according to the result of CCA (LBT) (for example, a result of LBT for each LBT subband).

On the other hand, as described above, it is also considered that the transmission point transmits a channel (for example, PDSCH or PUSCH) across a plurality of contiguous LBT subbands in the wide band carrier. However, when LBT is performed for each LBT subband, the LBT of each of the plurality of LBT subbands does not always succeed, and it is also assumed that only the LBT of some LBT subbands succeeds.

Therefore, how to control channel transmission in a plurality of contiguous LBT subbands according to the result of LBT for each LBT subband becomes a problem. For example, as illustrated in FIG. 1, when a guard band is provided at least at one end of each LBT subband, how to use the guard band becomes a problem.

Therefore, the present inventors have studied a method of appropriately controlling transmission of a channel in at least one of a plurality of contiguous LBT subbands according to the result of LBT for each LBT subband, and have reached the present invention.

Embodiments according to the present invention will be described below in detail with reference to the drawings. Aspects of the present embodiment may be applied individually or in combination.

Note that, in the present embodiment, the "transmission point (transmission apparatus)" is, for example, at least one of a base station and UE. When the transmission point is a base station, the "channel" may be at least one of a DL channel (for example, PDSCH) and a DL signal. Further, in a case where the transmission point is UE, the "channel" may be at least one of a UL channel (for example, PUSCH) and a UL signal.

Further, in the present embodiment, the "channel", the "signal", the "data", and the "subchannel" may be replaced with each other. Further, in the present embodiment, the "subchannel" and the "LBT subband" may also be replaced with each other.

First Aspect

In a first aspect, the transmission point controls transmission of a channel in each of a plurality of LBT subbands contiguous in a frequency direction in a wide band carrier according to a result of listening of each of the plurality of LBT subbands.

Specifically, when listening succeeds for at least one of the contiguous LBT subbands, the transmission point may transmit a channel with each LBT subband for which listening has succeeded.

On the other hand, when listening does not succeed for at least one of the contiguous LBT subbands, the transmission point may stop transmission of a channel with each LBT subband for which listening has failed.

A guard band may be provided (first transmission control) or may not be provided (second transmission control) between a plurality of contiguous subbands for which the listening succeeds.

<First Transmission Control>

Figure 2:
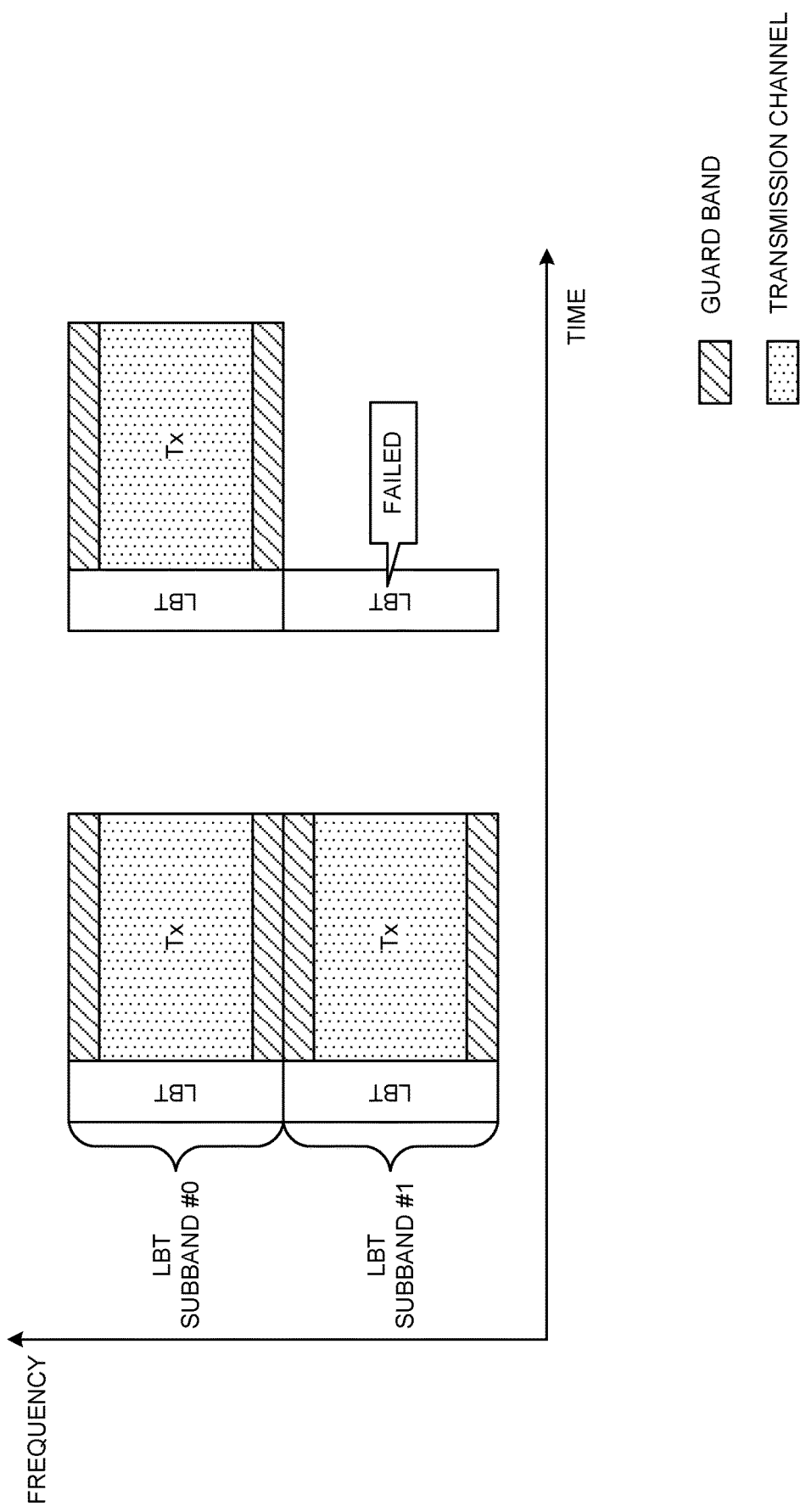
FIG. 2 is a diagram illustrating an example of first transmission control of a channel with contiguous LBT subbands according to a first aspect.

FIG. 2 is a diagram illustrating an example of the first transmission control of a channel with contiguous LBT subbands according to the first aspect. For example, FIG. 2 illustrates an example in which two LBT subbands #0 and #1 contiguous in the frequency direction are provided in the wide band carrier. Note that the arrangement of the LBT subbands in FIG. 2 is merely an example, and is not limited to that illustrated.

In FIG. 2, the transmission point may perform LBT for each LBT subband in the wide band carrier. Specifically, the transmission point may control the transmission of the channel with each of the contiguous LBT subbands #0 and #1 based on the result of listening for each of the contiguous LBT subbands #0 and #1.

For example, as illustrated in FIG. 2, when listening succeeds for all of the contiguous LBT subbands #0 and #1, the transmission point may transmit a channel (data Tx) with each of the contiguous LBT subbands #0 and #1.

On the other hand, when the listening succeeds for the LBT subband #0, which is a part of the contiguous LBT subbands #0 and #1, and the listening fails for the LBT subband #1, which is the other, the transmission point may transmit the channel with the LBT subband #0 for which the listening has succeeded and stop transmission of (may not transmit) the channel with the LBT subband #1 for which the listening has failed.

In FIG. 2, the guard band may be provided at both ends of each LBT subband in the wide band carrier. As illustrated in FIG. 2, a channel may not be allocated (may not be transmitted) to the guard band in each LBT subband regardless of whether or not listening succeeds for the contiguous LBT subbands #0 and #1.

That is, in FIG. 2, even when the listening succeeds for the contiguous LBT subbands #0 and #1, a channel is not allocated to the guard band provided in the area where the LBT subbands #0 and #1 are adjacent.

In FIG. 2, since the guard band is fixedly provided regardless of whether or not the listening succeeds for the contiguous LBT subbands, it is not necessary to change the channel allocation area depending on whether or not the listening succeeds for the plurality of contiguous LBT subbands. Therefore, it is possible to suppress a transmission signal change processing amount instantaneously required according to the result of listening of each LBT subband.

<Second Transmission Control>

Figure 3:
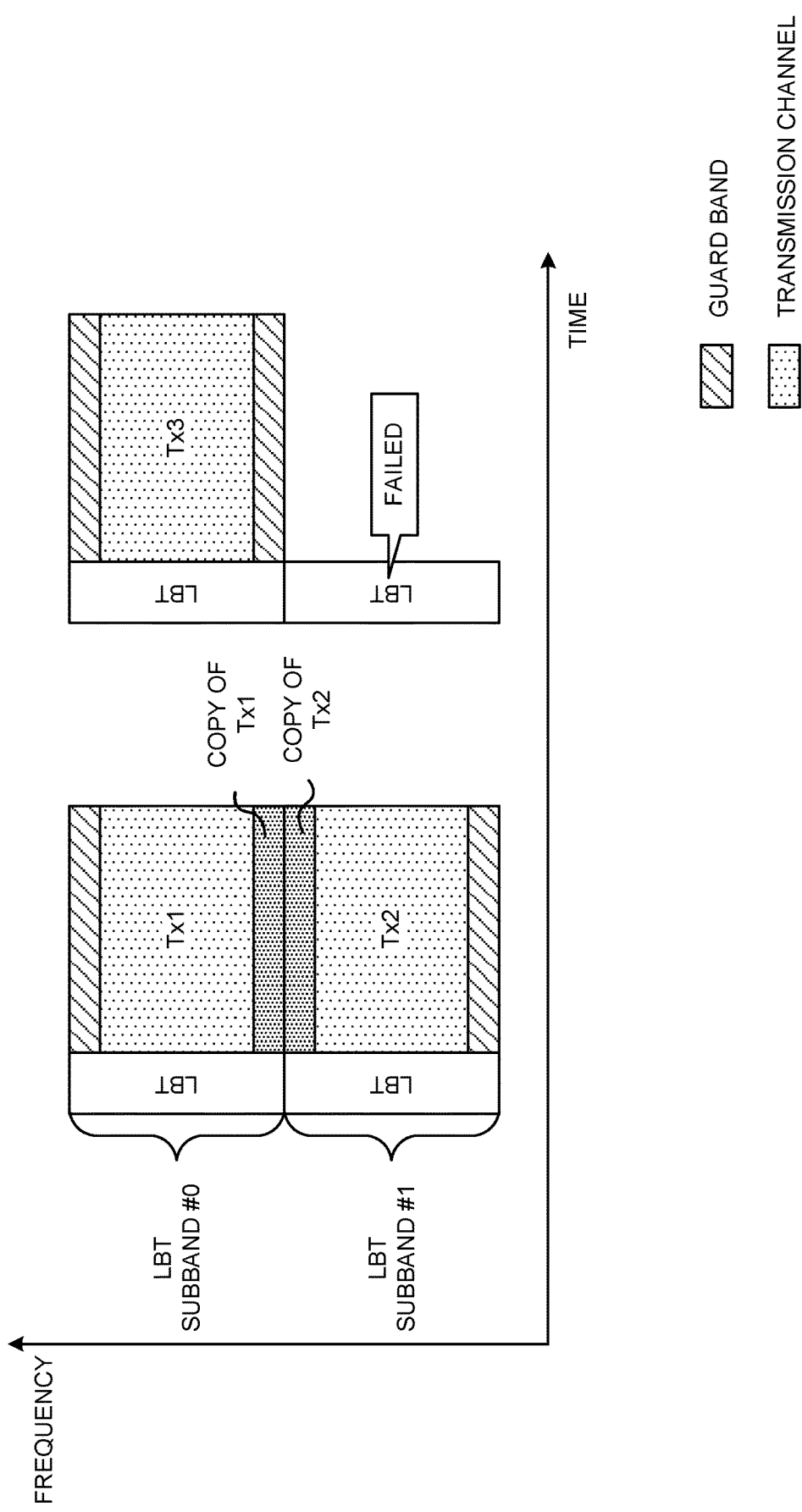
FIG. 3 is a diagram illustrating an example of second transmission control of a channel with contiguous LBT subbands according to the first aspect.

FIG. 3 is a diagram illustrating an example of the second transmission control of a channel with contiguous LBT subbands according to the first aspect. FIG. 3 is different from FIG. 2 in that allocation of a channel (data Tx) to at least some guard bands of each LBT subband is controlled according to whether or not the listening succeeds for contiguous LBT subbands.

In FIG. 3, the transmission point may perform LBT for each LBT subband in the wide band carrier. Specifically, the transmission point may control the transmission of the channel with each of the contiguous LBT subbands #0 and #1 based on the result of listening for each of the contiguous LBT subbands #0 and #1.

For example, as illustrated in FIG. 3, when listening succeeds for all of the contiguous LBT subbands #0 and #1, the transmission point may transmit a channel with each of the contiguous LBT subbands #0 and #1.

On the other hand, when the listening succeeds for the LBT subband #0, which is a part of the contiguous LBT subbands #0 and #1, and the listening fails for the LBT subband #1, which is the other, the transmission point may transmit the channel with the LBT subband #0 for which the listening has succeeded and stop transmission of (may not transmit) the channel with the LBT subband #1 for which the listening has failed.

In FIG. 3, the guard band may be provided at both ends of each LBT subband in the wide band carrier. As illustrated in FIG. 3, in at least some guard bands in each LBT subband, allocation (transmission) of a channel (data Tx) may be controlled based on whether or not the listening succeeds for the contiguous LBT subbands #0 and #1.

For example, in FIG. 3, when the listening succeeds for the contiguous LBT subbands #0 and #1, a channel is allocated to (a resource area corresponding to) the guard band provided in the area where the LBT subbands #0 and #1 are adjacent.

In this case, at least a part of data Tx' transmitted in the LBT subband #0 may be copied to the guard band in the LBT subband #0 adjacent to the LBT subband #1. On the other hand, at least a part of data Tx2 transmitted in the LBT subband #1 may be copied to the guard band in the LBT subband #1 adjacent to the LBT subband #0. In this manner, the guard bands adjacent between the LBT subbands #0 and #1 may be used for data redundancy.

Note that, in each of the LBT subbands #0 and #1, at least a part (channel) of the data Tx' and Tx2 may not be allocated to the guard bands provided in an area where they are not adjacent to each other, and the area may not be used as a guard band.

On the other hand, in FIG. 3, when the listening succeeds for a part of the contiguous LBT subbands #0 and #1, both end areas of the LBT subband #0 for which the listening has succeeded may be used as guard bands (a channel may not be allocated to the both end areas). That is, a channel is not allocated to the guard band provided in the area adjacent to the LBT subband #1 in order to prevent interference from another system using the LBT subband #1.

In FIG. 3, in a case where the listening succeeds for all of the contiguous LBT subbands, redundancy can be achieved by copying at least a part of the data to the guard band in the adjacent area of the LBT subband, and therefore, in a case where the contiguous LBT subbands can be used, the reliability of the transmission data can be improved. Further, it is possible to suppress a transmission signal change processing amount instantaneously required according to the result of listening of each LBT subband.

As described above, in the first aspect, the transmission of a channel in each of a plurality of LBT subbands contiguous in a frequency direction in a wide band carrier is controlled according to the result of listening of each LBT subband. Therefore, the transmission of a channel with each LBT subband can be flexibly controlled.

Second Aspect

In a second aspect, the transmission point controls transmission of a channel in a plurality of LBT subbands contiguous in a frequency direction in a wide band carrier according to a result of listening of all of the plurality of LBT subbands.

Specifically, when listening succeeds for all of the contiguous LBT subbands, the transmission point may transmit a channel with the contiguous LBT subbands. On the other hand, when listening fails for some of the contiguous LBT subbands, the transmission point may stop transmission of a channel with all of the contiguous LBT subbands.

Figure 4:
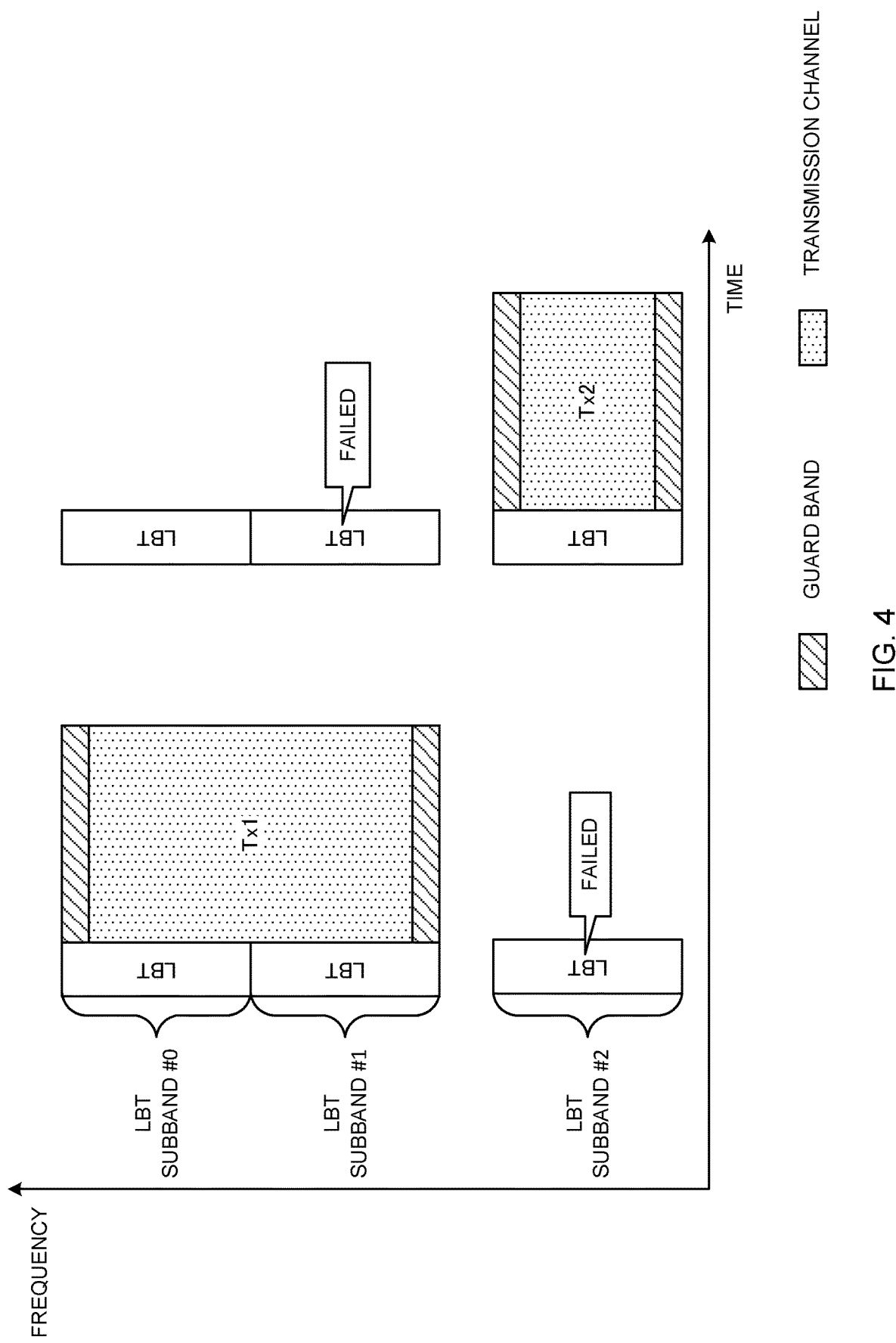
FIG. 4 is a diagram illustrating an example of transmission control of a channel with contiguous LBT subbands according to a second aspect.

FIG. 4 is a diagram illustrating an example of transmission control of a channel with contiguous LBT subbands according to the second aspect. For example, FIG. 4 illustrates an example in which two contiguous LBT subbands #0 and #1 and one LBT subband #2 that is not contiguous (non-contiguous) with the LBT subband #0 or #1 are provided in the wide band carrier. Note that the arrangement of the LBT subbands in FIG. 4 is merely an example, and is not limited to that illustrated.

In FIG. 4, the transmission point may perform LBT for each LBT subband in the wide band carrier. Specifically, the transmission point may control the transmission of the channel with the contiguous LBT subbands #0 and #1 based on whether or not the listening succeeds for all of the contiguous LBT subbands #0 and #1.

For example, as illustrated in FIG. 4, when listening succeeds for all of the contiguous LBT subbands #0 and #1, the transmission point may transmit a channel (data Tx) allocated across the contiguous LBT subbands #0 and #1.

Further, the channel may be allocated and transmitted without providing a guard band between the LBT subbands #0 and #1. On the other hand, in each of the LBT subbands #0 and #1, the guard band may be provided in an edge area that is not adjacent to another LBT subband.

On the other hand, as illustrated in FIG. 4, when the listening succeeds for a part of the contiguous LBT subbands #0 and #1 (for example, in FIG. 4, the LBT of the LBT subband #0 succeeds, but the LBT of the LBT subband #1 fails), the transmission point may stop the transmission of the channel across the contiguous LBT subbands #0 and #1.

Further, regarding a single LBT subband #2 that is not contiguous with the LBT subband #0 or #1, the transmission point may control the transmission of the channel with the LBT subband #2 based on whether or not the listening for the LBT subband #2 succeeds.

For example, as illustrated in FIG. 4, the transmission point may stop transmission of a channel with the LBT subband #2 when the LBT for the LBT subband #2 fails, and transmit a channel with the LBT subband #2 when the LBT for the LBT subband #2 succeeds.

As described above, in the second aspect, the transmission point performs listening for each LBT subband in the wide band carrier, and when listening succeeds for all of the plurality of contiguous LBT subbands, can transmit the channel using the plurality of contiguous LBT subbands without providing a guard band between the plurality of LBT subbands. Therefore, when the contiguous LBT subbands can be used, the frequency utilization efficiency can be improved.

Further, in the second aspect, even when the listening succeeds for only some of the plurality of contiguous LBT subbands, the transmission point stops the transmission of the channel using the plurality of contiguous LBT subbands and does not transmit the channel with some LBT subbands. Therefore, it is possible to suppress a transmission signal change processing amount instantaneously required according to the result of listening for the plurality of contiguous LBT subbands.

Other Aspects

At least a part of the first aspect and the second aspect may be combined or used alone. For example, the LBT subband illustrated in FIG. 2 or 3 and the LBT subband illustrated in FIG. 4 may be mixed in the same wide band carrier. Further, the LBT subbands illustrated in FIGS. 2 to 4 may be mixed in the same wide band carrier.

(Radio Communication System)

A configuration of a radio communication system according to one embodiment of the present disclosure will be described below. In this radio communication system, communication is performed using one or a combination of the radio communication methods according to the embodiments of the present disclosure.

Figure 5:
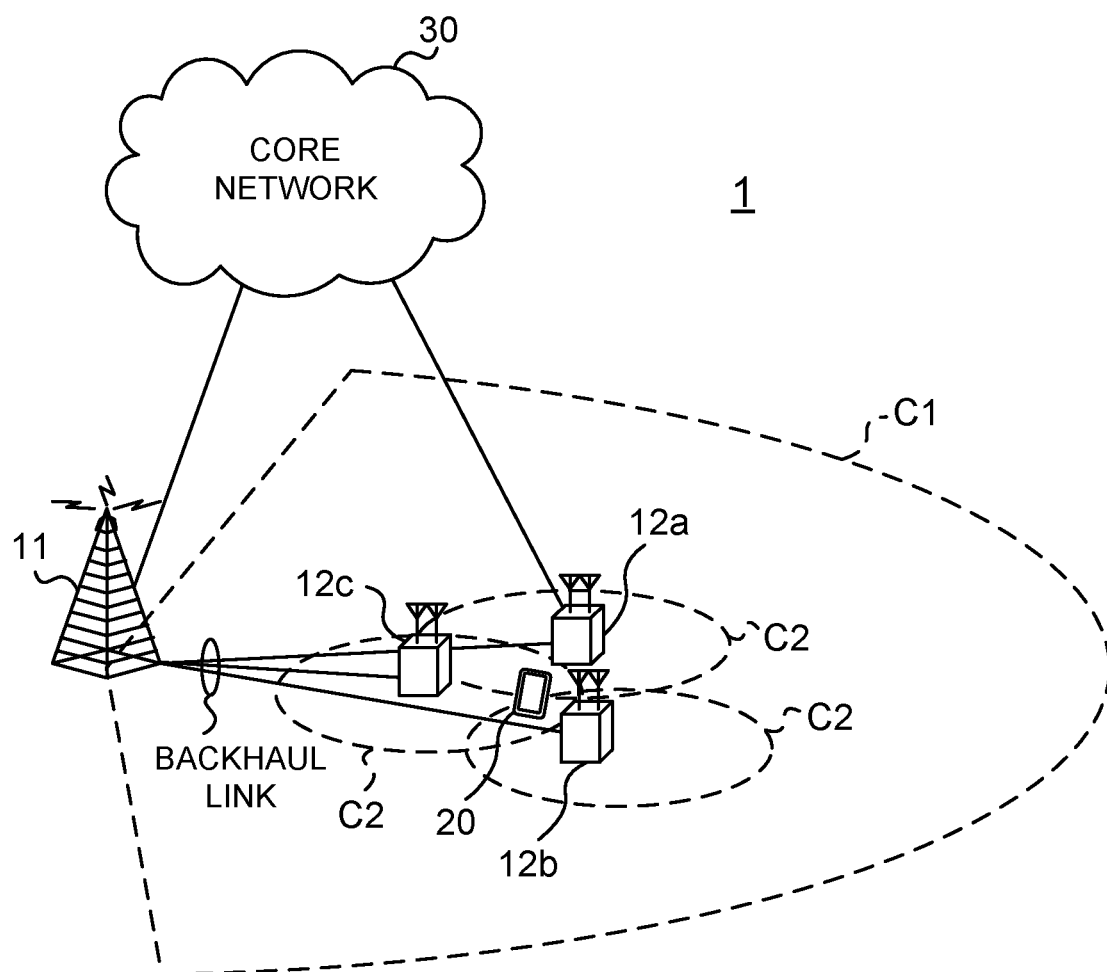
FIG. 5 is a diagram illustrating an example of a schematic configuration of a radio communication system according to one embodiment.

FIG. 5 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. User terminal 20 may be located in at least one cell. The arrangement, number, and the like of cells and the user terminal 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminal 20, a physical uplink control channel (PUCCH), a physical random access channel (PRACH), or the like may be used.

User data, higher layer control information, and a system information block (SIB) and the like are transmitted by the PDSCH. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a given search space based on search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), and the like may be transmitted by the PUCCH. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SS block (SSB), and the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)".

(Base Station)

Figure 6:
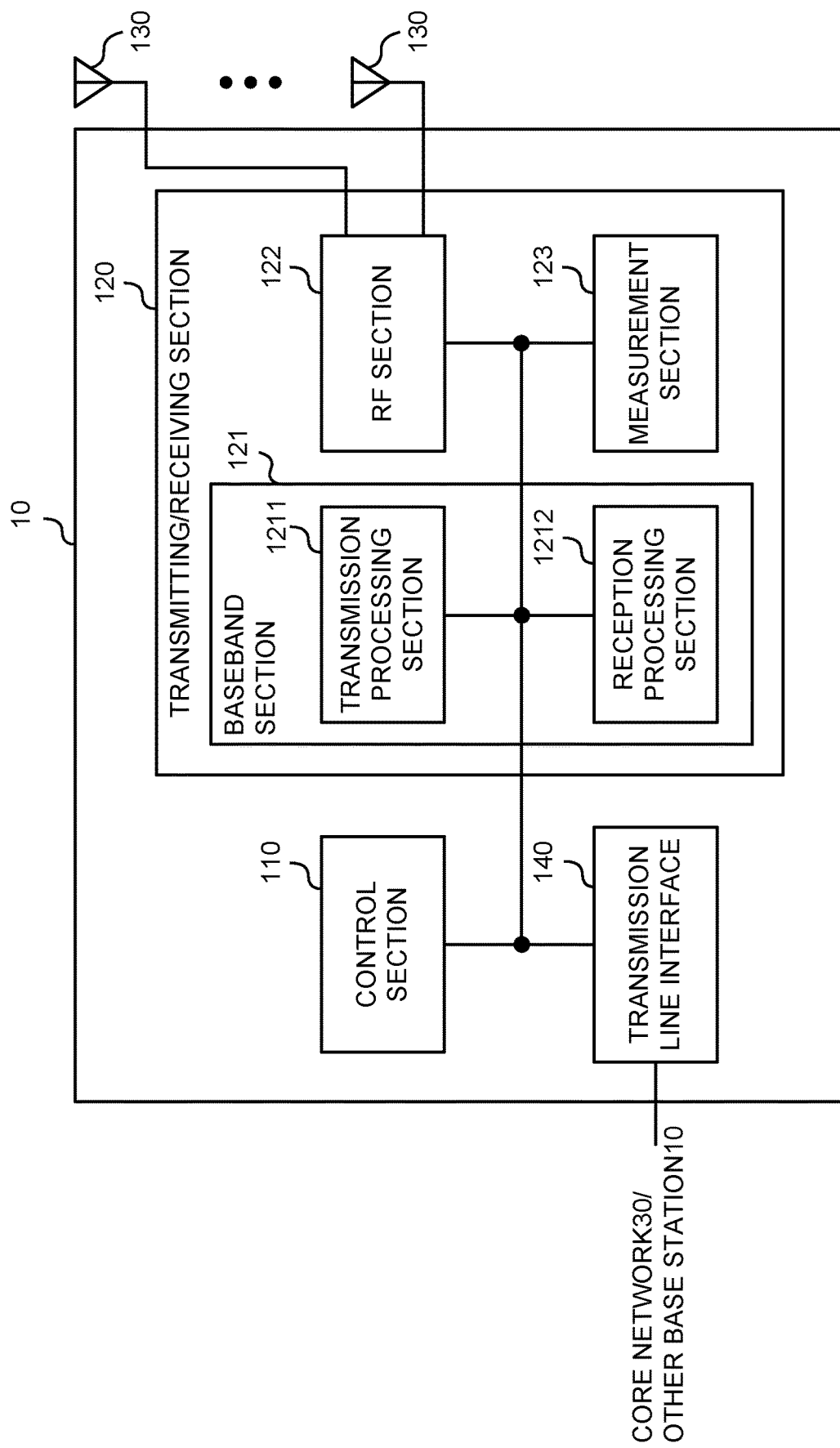
FIG. 6 is a diagram illustrating an example of a configuration of a base station according to one embodiment.

FIG. 6 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

Note that the transmitting/receiving section 120 may transmit a channel (for example, a PDSCH, which is also referred to as a DL channel, a DL signal, data, and the like).

The control section 110 may control transmission of the channel with at least one of a plurality of contiguous bands provided in a carrier based on a result of listening for each band (LBT subband) provided in the carrier.

Further, the control section 110 may control transmission of the channel allocated across the plurality of contiguous bands based on whether or not listening succeeds for all of the plurality of contiguous bands (second aspect).

Further, the control section 110 may control transmission of the channel with each of the plurality of contiguous bands based on whether or not listening succeeds for each of the plurality of contiguous bands (first aspect).

Further, the control section 110 may stop the allocation of the channel to the guard band provided in each of the plurality of bands regardless of whether or not listening succeeds for all of the plurality of contiguous bands (first transmission control of the first aspect).

Further, the control section 110 may control the allocation of the channel to at least one guard band provided in each of the plurality of bands based on whether or not listening succeeds for all of the plurality of contiguous bands (second transmission control of the first aspect).

(User Terminal)

Figure 7:
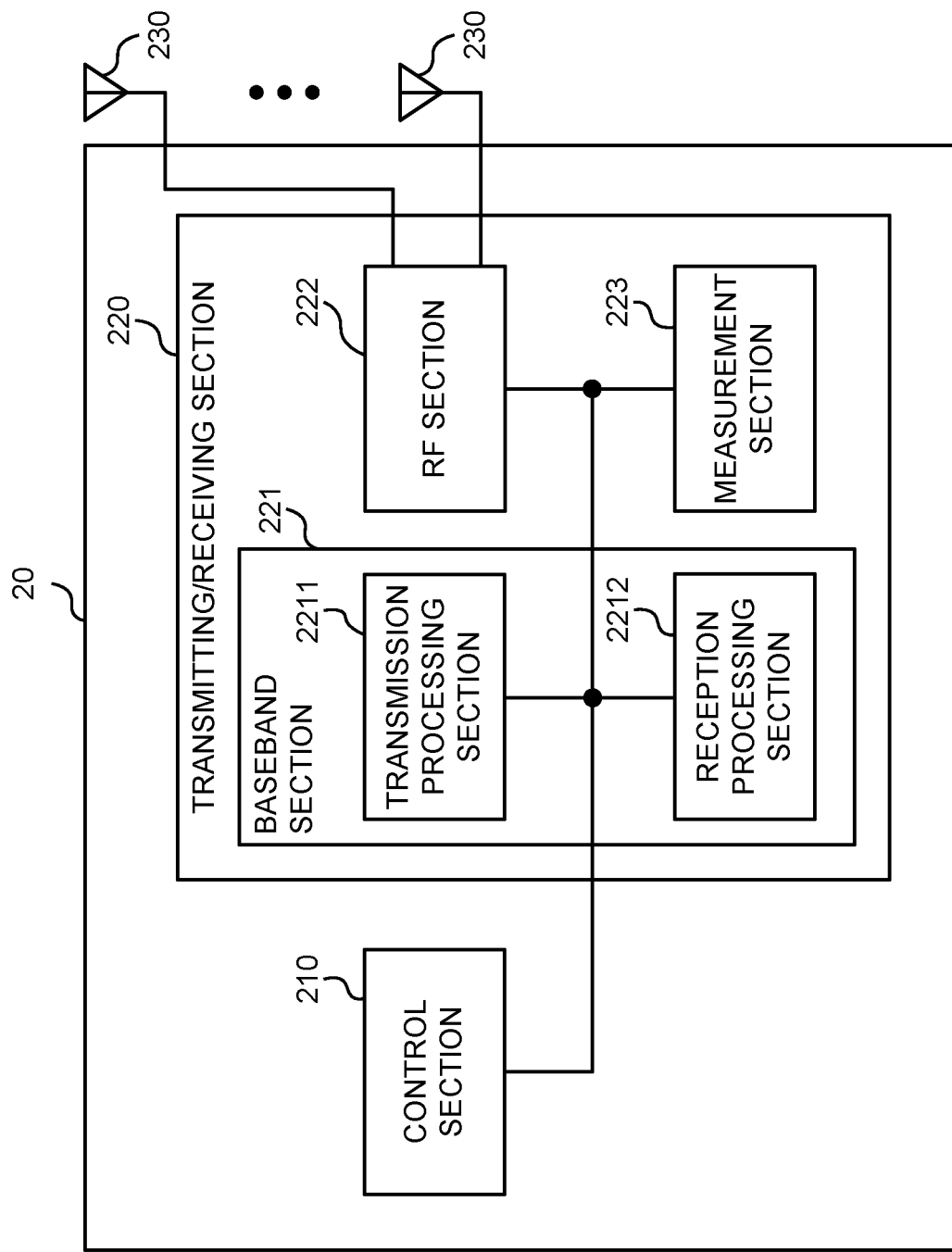
FIG. 7 is a diagram illustrating an example of a configuration of user terminal according to one embodiment.

FIG. 7 is a diagram illustrating an example of a configuration of user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) may not perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, and the transmission line interface 240.

Note that the transmitting/receiving section 220 may transmit a channel (for example, a PUSCH, which is also referred to as a UL channel, a UL signal, data, and the like).

The control section 210 may control transmission of the channel with at least one of a plurality of contiguous bands provided in a carrier based on a result of listening for each band (LBT subband) provided in the carrier.

Further, the control section 210 may control transmission of the channel allocated across the plurality of contiguous bands based on whether or not listening succeeds for all of the plurality of contiguous bands (second aspect).

Further, the control section 210 may control transmission of the channel with each of the plurality of contiguous bands based on whether or not listening succeeds for each of the plurality of contiguous bands (first aspect).

Further, the control section 210 may stop the allocation of the channel to the guard band provided in each of the plurality of bands regardless of whether or not listening succeeds for all of the plurality of contiguous bands (first transmission control of the first aspect).

Further, the control section 210 may control the allocation of the channel to at least one guard band provided in each of the plurality of bands based on whether or not listening succeeds for all of the plurality of contiguous bands (second transmission control of the first aspect).

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, wireless, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be called as a transmitting unit, a transmitter and the like. In any case, as described above, the implementation method is not particularly limited.

Figure 8:
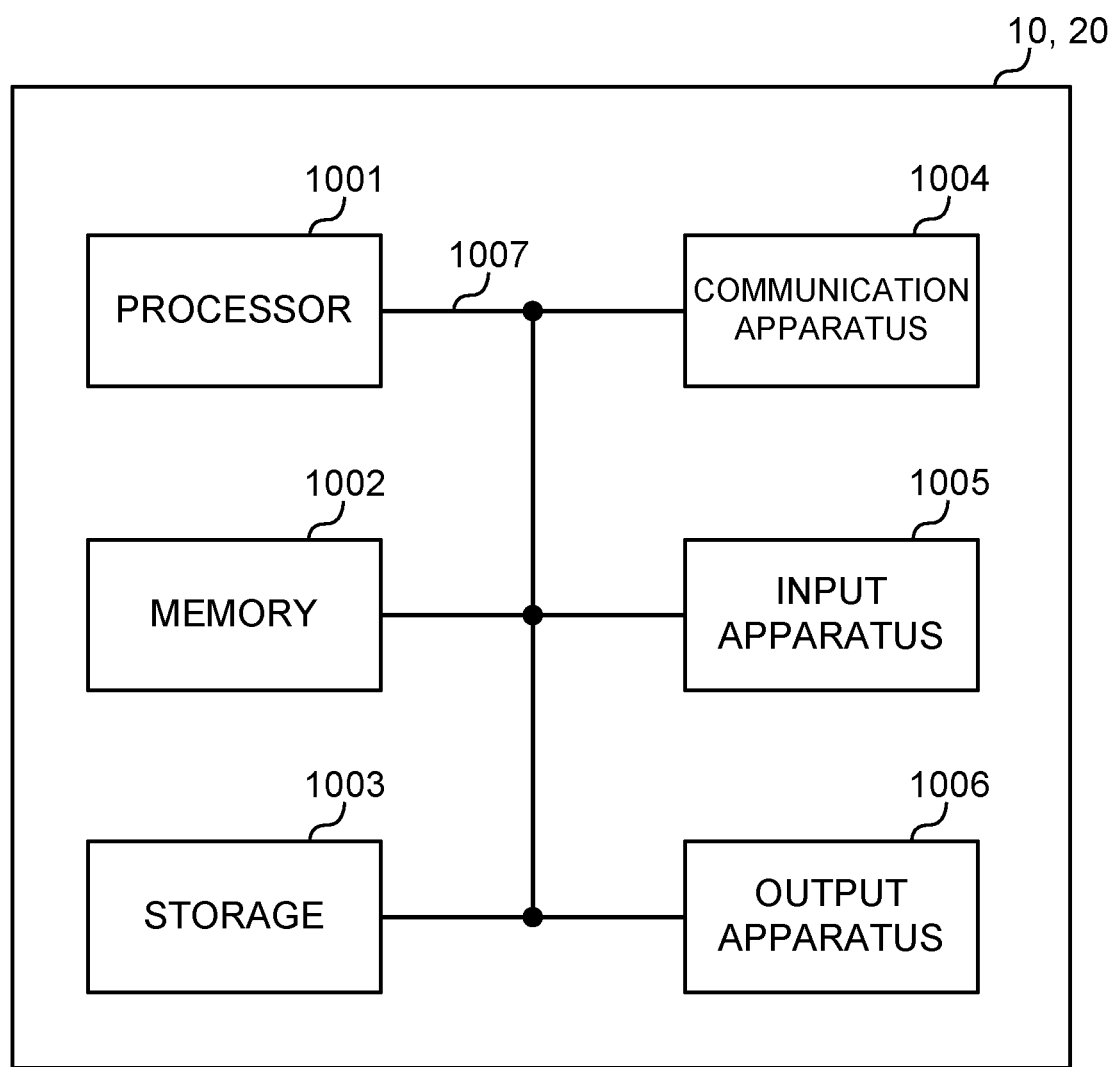
FIG. 8 is a diagram illustrating an example of a hardware configuration of a base station and user terminal according to one embodiment.

For example, the base station, the user terminal, and the like according to one embodiment of the present disclosure may function as a computer that executes the processing of the radio communication method of the present disclosure. FIG. 8 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed simultaneously, in sequence, or in different manners, by two or more processors. Note that the processor 1001 may be implemented with one or more chips.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 may control the whole computer by, for example, running an operating system. The processor 1001 may be configured with a central processing unit (CPU), which includes interfaces with peripheral equipment, control apparatus, operation apparatus, a register, and the like. For example, at least a part of the above-described control section 110(210), transmitting/receiving section 120 (220), and the like may be implemented by the processor 1001.

Furthermore, the processor 1001 reads programs (program codes), software modules, or data, from at least one of the storage 1003 and the communication apparatus 1004, into the memory 1002, and executes various processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may be constituted by, for example, at least one of a read only memory (ROM), an erasable programmable ROM (EPROM), an electrically EPROM (EEPROM), a random access memory (RAM) and/or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as an auxiliary storage apparatus.

The communication apparatus 1004 is hardware (transmitting/receiving device) for allowing inter-computer communication by using at least one of a wired network and a wireless network, and may be referred to as, for example, a network device, a network controller, a network card, a communication module, and the like. The communication apparatus 1004 may be constituted by a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130(230), and the like described above may be implemented by the communication apparatus 1004. The transmitting/receiving section 120(220) may be implemented by physically or logically separating a transmitting section 120a(220a) and a receiving section 120b(220b) from each other.

The input apparatus 1005 is an input device for receiving input from the outside (for example, a keyboard, a mouse, a microphone, a switch, a button, a sensor, and the like). The output apparatus 1006 is an output device for allowing output to the outside (for example, a display, a speaker, a light emitting diode (LED) lamp, and the like). Note that the input apparatus 1005 and the output apparatus 1006 may be provided in an integrated configuration (for example, a touch panel).

Further, the apparatuses such as the processor 1001 and the memory 1002 are connected by the bus 1007 for communicating information. The bus 1007 may be configured with a single bus, or may be configured with different buses between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (or signaling) may be replaced with each other. Further, the signal may be a message. The reference signal can be abbreviated as an RS, and may be referred to as a pilot, a pilot signal and the like, depending on the standard applied. Furthermore, a component carrier (CC) may be referred to as a cell, a frequency carrier, a carrier frequency, and the like.

A radio frame may include one or a plurality of periods (frames) in a time domain. Each of one or a plurality of periods (frames) constituting a radio frame may be referred to as a subframe. Furthermore, a subframe may be constituted by one or a plurality of slots in the time domain. A subframe may be a fixed time duration (for example, 1 ms) that is not dependent on numerology.

Here, numerology may be a communication parameter applied to at least one of transmission and reception of a given signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

A slot may be constituted by one or a plurality of symbols in the time domain (orthogonal frequency division multiplexing (OFDM) symbols, single carrier frequency division multiple access (SC-FDMA) symbols, and the like). Further, the slot may be a time unit based on numerology.

A slot may include a plurality of mini slots. Each mini slot may be constituted by one or a plurality of symbols in the time domain. Further, a mini slot may be referred to as a subslot. The mini slot may include fewer symbols than the slot. A PDSCH (or PUSCH) transmitted in a time unit larger than a mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot and a symbol all represent the time unit in signal transmission. The radio frame, the subframe, the slot, the mini slot, and the symbol may be each called by other applicable names. Note that time units such as a frame, a subframe, a slot, a mini slot, and a symbol in the present disclosure may be replaced with each other.

For example, one subframe may be referred to as TTI, a plurality of contiguous subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a slot, a mini slot or the like, instead of a subframe.

Here, the TTI refers to, for example, the minimum time unit of scheduling in radio communication. For example, in LTE systems, the base station schedules the radio resources (such as the frequency bandwidth and transmission power that can be used in each user terminal) to allocate to each user terminal in TTI units. Note that the definition of TTI is not limited thereto.

The TTI may be the transmission time unit of channel-encoded data packets (transport blocks), code blocks, codewords, or the like, or may be the unit of processing in scheduling, link adaptation, or the like. Note that, when the TTI is given, a time interval (for example, the number of symbols) to which the transport block, code block, codeword, or the like is actually mapped may be shorter than the TTI.

Note that, when one slot or one mini slot is referred to as a TTI, one or more TTIs (that is, one or more slots or one or more mini slots) may be the minimum time unit of scheduling. Further, the number of slots (the number of mini slots) constituting the minimum time unit of scheduling may be controlled.

A TTI having a time length of 1 ms may be referred to as a usual TTI (TTI in 3GPP Rel.8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (for example, a normal TTI, a subframe, or the like) may be replaced with a TTI having a time length exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of contiguous subcarriers in the frequency domain. The number of subcarriers included in the RB may be the same regardless of the numerology, and may, for example, be 12. The number of subcarriers included in the RB may be determined based on the numerology.

Further, the RB may include one or a plurality of symbols in the time domain, and may have a length of one slot, one mini slot, one subframe, or one TTI. One TTI, one subframe, and the like each may be constituted by one or a plurality of resource blocks.

Note that one or a plurality of RBs may be referred to as a physical resource block (PRB (Physical RB)), a subcarrier group (SCG (Sub-Carrier Group)), a resource element group (REG), a PRB pair, an RB pair, or the like.

Furthermore, a resource block may be constituted by one or a plurality of resource elements (REs). For example, one RE may be a radio resource area of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. The PRB may be defined in a given BWP and be numbered within the BWP.

The BWP may include BWP for UL (UL BWP) and BWP for DL (DL BWP). For the UE, one or a plurality of BWPs may be configured within one carrier.

At least one of the configured BWPs may be active, and it may not be assumed that the UE transmits and receives a given signal/channel outside the active BWP. Note that a "cell", a "carrier", or the like in the present disclosure may be replaced with the "BWP".

Note that the structures of radio frames, subframes, slots, mini slots, symbols and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Further, the information, parameters, and the like described in the present disclosure may be represented using absolute values or relative values with respect to given values, or may be represented using other corresponding information. For example, a radio resource may be instructed by a given index.

The names used for parameters and the like in the present disclosure are in no respect limiting. In addition, an equation and the like using these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using any of a variety of different technologies. For example, data, instructions, commands, information, signals, bits, symbols, chips, and the like all of which may be referenced throughout the above-described description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals, and the like may be input and output via a plurality of network nodes.

The information, signals, and the like that are input and output may be stored in a specific location (for example, in a memory), or may be managed using a management table. The information, signals, and the like to be input and output can be overwritten, updated or appended. The information, signals, and the like that are output may be deleted. The information, signals, and the like that are input may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Further, a notification of MAC signaling may be given using, for example, MAC control elements (MAC control elements (CEs)).

Further, a notification of given information (for example, notification of "being X") is not limited to explicit notification but may be performed implicitly (for example, by not performing notification of the given information or by performing notification of another piece of information).

Decisions may be made in values represented by one bit (0 or 1), may be made in Boolean values that represent true or false, or may be made by comparing numerical values (for example, comparison against a given value).

Regardless of whether software is referred to as software, firmware, middleware, microcode, or hardware description language, or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, software, instruction, information, and the like may be transmitted/received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (remote radio heads (RRHs)). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving body, a moving body itself, and the like. The moving body may be a transportation (for example, a car, an airplane and the like), an unmanned moving body (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may be configured to have the functions of the base station 10 described above. Further, the wording such as "uplink" and "downlink" may be replaced with the wording corresponding to the terminal-to-terminal communication (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20

In the present disclosure, the operation performed by the base station may be performed by an upper node thereof in some cases. In a network including one or a plurality of network nodes with base stations, it is clear that various operations performed for communication with a terminal can be performed by a base station, one or a plurality of network nodes (examples of which include but are not limited to mobility management entity (MME) and serving-gateway (S-GW)) other than the base station), or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as inconsistencies do not arise. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined (for example, a combination of LTE or LTE-A and 5G) and applied.

The phrase "based on" as used in the present disclosure does not mean "based on only", unless otherwise specified. In other words, the phrase "based on" means both "based only on" and "based at least on".

Any reference to an element using designations such as "first" and "second" used in the present disclosure does not generally limit the amount or order of these elements. These designations may be used in the present disclosure as a method convenient in distinguishing between two or more elements. In this way, reference to the first and second elements does not imply that only two elements may be employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, "determining" may be regarded as "determining" of receiving (for example, receiving of information), transmitting (for example, transmitting of information), input, output, accessing (for example, accessing to data in a memory), and the like.

Further, "determining" may be regarded as "determining" of resolving, selecting, choosing, establishing, comparing, and the like. In other words, "determining" may be regarded as "determining" of a given operation.

Further, "determining" may be replaced with "assuming", "expecting", "considering", and the like.

The "maximum transmission power" described in the present disclosure may mean a maximum value of transmission power, the nominal UE maximum transmit power, or the rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the phrase may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided for the purpose of exemplification and explanation, and has no limitative meaning to the invention according to the present disclosure.

This application is based on Japanese Patent Application No. 2019-022055 filed on Jan. 23, 2019. The contents of this are all incorporated herein.

The invention claimed is:

1. A terminal comprising:
   a transmitter that transmits an uplink channel in a license-assisted access SCell (LAA SCell); and
   a processor that performs a channel access procedure in each band in a plurality of contiguous bands configured in a carrier, and when channel access is performed successfully in all of the each band, controls transmission of the uplink channel in the plurality of contiguous bands,
   wherein a guard band is fixedly configured, irrespective of whether or not the channel access is performed successfully in the each band.

2. The terminal according to claim 1, wherein the each band comprises a plurality of resource blocks (RBs).

3. A radio communication method for a terminal, comprising:
   transmitting an uplink channel in a license-assisted access SCell (LAA SCell); and
   performing a channel access procedure in each band in a plurality of contiguous bands configured in a carrier, and when channel access is performed successfully in all of the each band, controlling transmission of the uplink channel in the plurality of contiguous bands,
   wherein a guard band is fixedly configured, irrespective of whether or not the channel access is performed successfully in the each band.

4. A base station comprising:
   a transmitter that transmits a downlink channel in a license-assisted access SCell (LAA SCell); and
   a processor that performs a channel access procedure in each band in a plurality of contiguous bands configured in a carrier, and controls, based on whether or not channel access is performed successfully in the each band, transmission of the downlink channel in the each band, wherein a guard band is fixedly configured irrespective of whether or not the channel access is performed successfully in the each band.

5. A system comprising a terminal and a base station, wherein the terminal comprises:
- a transmitter that transmits an uplink channel in a license-assisted access SCell (LAA SCell); and
- a processor that performs a channel access procedure in each band in a plurality of contiguous bands configured in a carrier, and when channel access is performed successfully in all of the each band, controls transmission of the uplink channel in the plurality of contiguous bands, and the base station comprises:
- a transmitter that transmits a downlink channel in the LAA SCell; and
- a processor that performs a channel access procedure in the each band in the plurality of contiguous bands, and controls, based on whether or not channel access is performed successfully in the each band, transmission of the downlink channel in the each band, wherein a guard band is fixedly configured, irrespective of whether or not the channel access is performed successfully in the each band.

* * * * *